United States Patent
Kundu et al.

(10) Patent No.: US 8,880,480 B2
(45) Date of Patent: Nov. 4, 2014

(54) METHOD AND APPARATUS FOR DATA ROLLBACK

(75) Inventors: Joydip Kundu, Derry, NH (US); Archie W. Brown, Milford, NH (US); Douglas A. Voss, Nashua, NH (US); Qinqin Wang, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 1301 days.

(21) Appl. No.: 11/649,180

(22) Filed: Jan. 3, 2007

(65) Prior Publication Data

US 2008/0162590 A1 Jul. 3, 2008

(51) Int. Cl.
*G06F 17/30* (2006.01)
*G06F 11/14* (2006.01)
*G06F 11/16* (2006.01)

(52) U.S. Cl.
CPC ...... *G06F 11/1471* (2013.01); *G06F 17/30575* (2013.01); *G06F 11/1662* (2013.01); *G06F 17/30368* (2013.01); *Y10S 707/99953* (2013.01)
USPC .... 707/682; 707/674; 707/678; 707/999.202; 707/E17.007

(58) Field of Classification Search
None
See application file for complete search history.

(56) References Cited

U.S. PATENT DOCUMENTS

| | | | |
|---|---|---|---|
| 6,615,223 B1* | 9/2003 | Shih et al. | 707/201 |
| 2003/0061537 A1* | 3/2003 | Cha et al. | 714/16 |
| 2004/0030954 A1* | 2/2004 | Loaiza et al. | 714/20 |
| 2005/0050110 A1* | 3/2005 | Sawdon et al. | 707/201 |

* cited by examiner

*Primary Examiner* — Anteneh Girma
(74) *Attorney, Agent, or Firm* — Kraguljac Law Group, LLC

(57) ABSTRACT

A database rollback processor allows rollback, or rewind, of the data and metadata to a point at which a failover or other metadata change occurred, therefore "rewinding" the metadata to a previous consistent point. The rollback processor identifies transaction entries in a redo log resulting in changes to the metadata. The changes are identified backward to a target recovery time. Transactions affecting the metadata are stored in a stack. The transactions are then backed out of the metadata according to the stack to restore the metadata to the state at the target recovery time. Data changes from the redo log may then be applied to the corresponding metadata as it existed at the target recovery time. Since the target recovery time is not bound by the timing of the snapshots, but rather may be at an arbitrary point chosen as the target recovery time, a failover, replication or recovery operation need not rely on the snapshot time.

11 Claims, 9 Drawing Sheets

FROM STEP 330

318
FORMULATE A DB COMMAND OPERABLE TO BACK OUT EACH OF THE TRANSACTIONS ON THE STACK, BACKING OUT PERFORMED BY FORMULATING AN INVERSE OF THE LOGGED DB COMMAND FOR EACH CHANGE IN EACH BACKED OUT TRANSACTION

319
DETERMINE VALUES APPLICABLE TO AN INVERSE SQL STATEMENT BY IDENTIFYING, FROM THE REDO LOG, A NEW VALUE APPLIED BY THE

320
IDENTIFY, FROM THE REDO LOG, AN OLD VALUE REPLACED BY THE NEW VALUE

321
RETRIEVE A PHYSICAL REFERENCE TO THE NEW VALUE

322
MAP THE PHYSICAL REFERENCE TO A LOGICAL REFERENCE INDICATIVE OF A DB ENTITY TO WHICH THE SQL STATEMENT APPLIES

323
RETRIEVE A PHYSICAL LOCATION SPECIFIER FROM THE PHYSICAL REFERENCE, THE PHYSICAL LOCATION SPECIFIER INDICATIVE OF A BLOCK ON A VOLUME

324
MAP THE PHYSICAL LOCATION SPECIFIER TO A NAME INDEX OF DATABASE OBJECT NAMES, THE DATABASE OBJECT NAMES CORRESPONDING TO DATABASE TABLES AND FIELDS

325
FORMULATE A SYNTACTICAL REPRESENTATION OF THE PHYSICAL LOCATION SPECIFIER INCLUDING THE MAPPED OBJECT NAMES, THE SYNTACTICAL REPRESENTATION OPERABLE TO PERFORM SIMILARLY AS THE PHYSICAL LOCATION SPECIFIER ON A DIFFERENT PHYSICAL VOLUME

326
RETRIEVE THE OLD VALUE FROM THE LOG

*Fig. 8*

METHOD AND APPARATUS FOR DATA ROLLBACK

BACKGROUND

In a modern managed information environment, large volumes of information are stored and processed. Storage takes the form of databases, or specialized mass storage mechanisms adapted for efficient storage and retrieval of the sometimes vast amounts of information stored in the database by an enterprise, organization, or application. In various contexts, certain databases will be replications of all or portions of another database which needs, for various reasons, to store data in an alternate database. Typically, the secondary (standby, replicated, secondary, etc.) database receives logs of changes made to the primary or main database. Such logs are often at a physical storage level, and enumerate changes according to the physical block, segment, track or other structure to which the change was made. However, the secondary database may not share a common physical structure with the primary database to which the logs pertain. Accordingly, the secondary database maintains a data dictionary corresponding to the structure of the data on the primary database. The data dictionary is employed to map logical data changes (changes in terms of database objects, such as SQL tables) to the physical structure, or storage locations, of the data. In this manner, the physical references in the logs may be "reverse mapped" to their logical counterparts so that corresponding changes may be made to the secondary database.

For example, in a modern information processing environment, data repositories, or databases, are often maintained in a redundant manner which minimizes or eliminates data loss in the event of failure. Such a redundant architecture often takes the form of a standby (standby DB) site, or hotsite, which mimics the primary site and receives all database updates so as to maintain a duplicate version of the data stored at the primary site (primary DB). Such a hotsite is typically remote from the primary site to enable the hotsite to commence operation in lieu of the primary site in the event of catastrophic or unexpected failure of the primary site, a so called "failover" operation. The hotsite, or standby site, is therefore enabled to assume operation as the primary site in a seamless manner since the primary and standby databases are maintained in a realtime or near realtime manner, being subject only to transmission latency and processing load delays.

Conventional modern data repositories take the form of a database which provides a normalized arrangement to the data for access via a database management system (DBMS). Often, modern databases take the form of a relational database using a relational DBMS, such as those available commercially form Oracle® corporation of Redwood Shores, Calif., assignee of the present application. A relational database stores data in a set of tables, each having columns of attributes arranged in rows. An often complex network of relationships exists between the database tables. The conventional network of relationships defines an entity-relation diagram (ER diagram), which defines each of the tables and relations to other tables in the relational database. A conventional DBMS is operable to traverse the tables in response to a query to access and/or modify the requested data.

In such a conventional relational database, the tables enumerated by the ER diagram depict a logical organization to the database based on the table and field identity. The table and field identity is independent of a physical arrangement of the actual data on the storage device (e.g. disk drive). Accordingly, in a standby hotsite arrangement, in contrast to a redundant hardware implementation, similar table and field references are not bound to similar locations on the respective storage device. Therefore, a conventional standby site may support a similar table arrangement at the primary site using a different physical array of storage devices. In this manner, the standby site need not procure an identical hardware arrangement as the primary site, a likely expensive proposition in large data repositories. Further, the standby site may also be operable to perform other storage operations, such as alternate standby support operations for other primary sites, since only the logical table arrangement, and not the physical disk arrangement, needs to be duplicated.

SUMMARY

In exemplary configurations, the method of replicating data stored in a main database as disclosed herein includes identifying a snapshot of the data corresponding to a particular snapshot time, and receiving a subsequent snapshot of a data dictionary corresponding to a subsequent time following the particular snapshot time, in which the data dictionary includes information that maps logical structures in the data to storage used to store the data. The method generates one or more logs representing changes made to the data and the data dictionary after the particular snapshot time, and analyzes the logs to identify the changes made to the data dictionary between the particular snapshot time and the subsequent time. The method then employs the subsequent snapshot of the data dictionary and the identified changes to generate a restore snapshot of the data dictionary corresponding to the particular snapshot time. Using the snapshot of the data, the logs and the restore snapshot of the data dictionary, the method replicates, in an alternate database, changes made to the logical structures in the data in the primary database after the particular snapshot time.

In a particular configuration, replication data for offline or test usage is generated, in which the subsequent snapshot of the data dictionary is generated in response to a request received at some time after the particular snapshot time to replicate the data stored in the main database. The logs representing changes made to the data and the data dictionary after the particular snapshot time and the snapshot of the data corresponding to the particular snapshot time are available in the main database at the time the subsequent snapshot of the data dictionary is generated. The data can thereby be replicated from a logical time earlier than the time at which the request to replicate is received. Further, such logs need not be immediately available in online storage but rather may be generated and/or retrieved from offline storage, backups and other longer term storage mediums.

In another particular arrangement, a failover to the main database occurs, thereby resulting in the main database operating as a primary database and the alternate database as a logical standby database for the main database as of the particular snapshot time. The main database permits changes to the data to be made before the subsequent snapshot of the data dictionary is generated, thereby avoiding the need to make the main database unavailable for updates at the time of failover for a period of time required to generate a snapshot of the data dictionary.

Alternate configurations of the invention include a multiprogramming or multiprocessing computerized device such as a workstation, handheld or laptop computer, cellphones or PDA device, or dedicated computing device or the like, configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 5-9 are a flowchart of an exemplary metadata rollback for a database restore operation according to FIG. 4.

DETAILED DESCRIPTION

Figure 1:
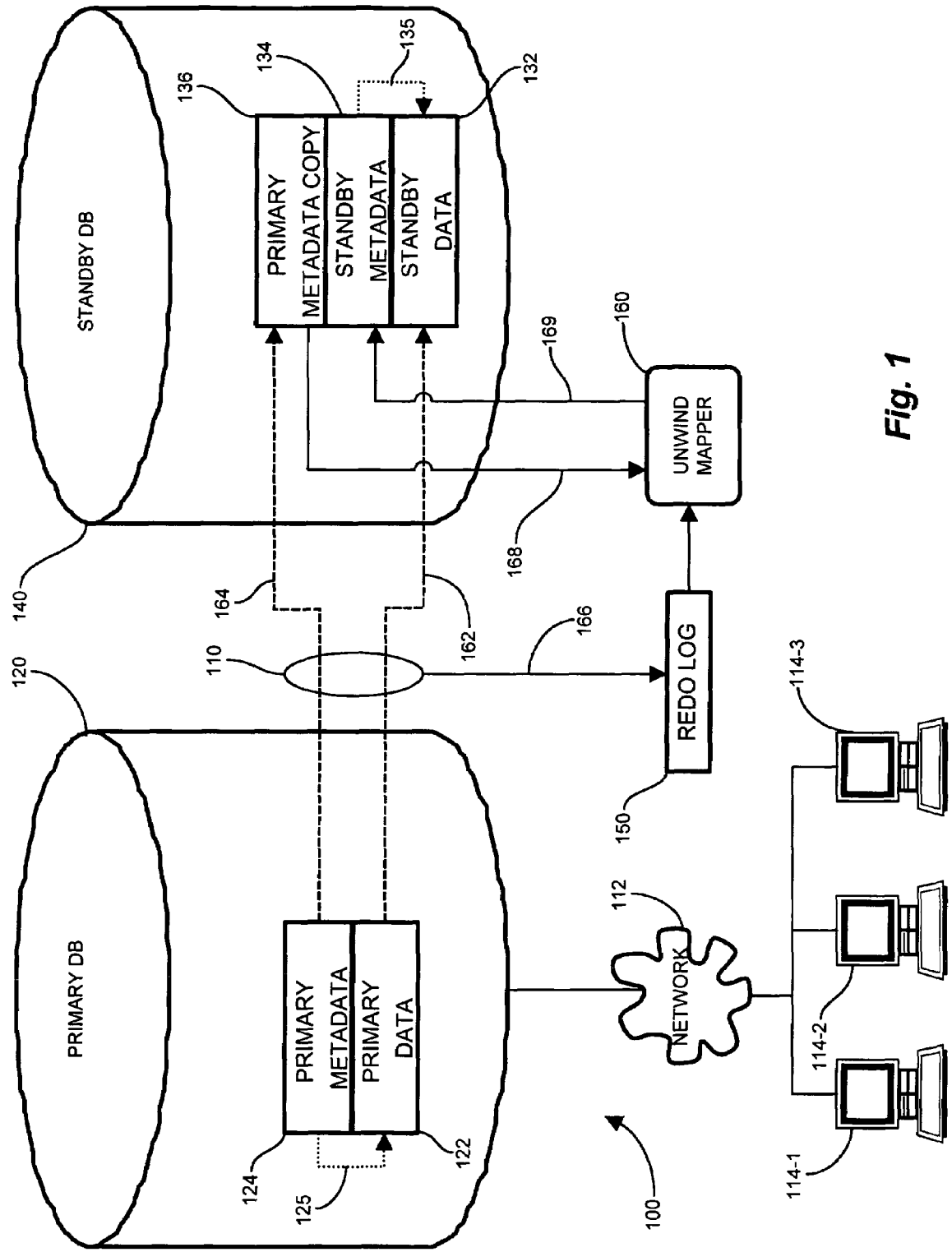
FIG. 1 is a context diagram of an exemplary standby database environment suitable for use with configurations discussed herein.

In a database environment, it is desirable to generate past versions of a database to enable restoration of the database to a previous state. Typical databases track changes in a journal or log of change records for identifying changes made from a predetermined point, or snapshot, to allow reversion to the snapshot. Databases often generate such snapshots periodically to allow reversion to the time of the snapshot. Such reversion may be desirable to facilitate replication, failover, or simply recovery from human error. Often, however, it is desirable to revert the database to a time other than the time at which a snapshot was taken. The change records required to revert the database may be unavailable, or may incur substantial processing overhead, such as locking the database, in order to bring the database to the desired point. Configurations of the invention are based, in part, on the observation that a snapshot may not be available for the time for which reversion is sought. Restoration of the data dictionary to a previous arbitrary time, rather then to a predetermined snapshot, may be desired. It would be beneficial, therefore, to deterministically compute the state of the database at an arbitrary previous state independent of the available snapshots and the physical structure of the databases sought to be reverted (rolled back).

Accordingly, particular configurations herein substantially overcome the above shortcomings by providing database rollback to an arbitrary time, rather then being bound by a predetermined snapshot. Such snapshots identify the physical structure, or layout, of the data at a particular time so that changes are applied and/or undone properly. Configurations herein provide a mechanism to identify logical changes made to the database structure, and revert the database by reversing changes made based on the database structure in place at the time the change was made. Changes may affect the structure of the data, as well as the content. Accordingly, restoration operations should apply changes to the corresponding database structure (i.e. to the database as it existed at the time the change was made). Configurations herein maintain a redo log (stream) of database operations to allow restoration of the database to a previous state, independent of snapshot intervals. Further, redundancy mechanisms such as standby and replication databases are often employed to mirror or parallel changes made to the main or primary database. Often, the redundancy mechanism employs a different physical arrangement than the primary database. Accordingly, rollback processing computes the database changes at a logical level and then computes the complementary physical updates at the secondary database.

The configurations employing such a primary and secondary arrangement may be due to a variety of contexts and scenarios. In a failover database configuration, the secondary database is a standby database to the primary database. At the time of a failover, the secondary database assumes primary status. As the "new" primary, the secondary database needs to generate a data dictionary consistent with the "old" primary at the time the failover occurred (i.e. as of when the "standby" became the "primary"). However, conventional generation of such a data dictionary snapshot is time consuming and would result in database unavailability. Generation of a data dictionary snapshot corresponding to a particular time involves locking the database for an extended period during which the conventional database is unavailable.

In exemplary configurations, the method of replicating data stored in a main database as disclosed herein includes identifying a snapshot of the data corresponding to a particular snapshot time, and receiving a subsequent snapshot of a data dictionary corresponding to a subsequent time following the particular snapshot time, in which the data dictionary includes information that maps logical structures in the data to storage used to store the data. The method generates one or more logs representing changes made to the data and the data dictionary after the particular snapshot time, and analyzes the logs to identify the changes made to the data dictionary between the particular snapshot time and the subsequent time. The method then employs the subsequent snapshot of the data dictionary and the identified changes to generate a restore snapshot of the data dictionary corresponding to the particular snapshot time. Using the snapshot of the data, the logs and the restore snapshot of the data dictionary, the method replicates, in an alternate database, changes made to the logical structures in the data in the primary database after the particular snapshot time.

In a particular configuration, replication data for offline or test usage is generated, in which the subsequent snapshot of the data dictionary is generated in response to a request received at some time after the particular snapshot time to replicate the data stored in the main database. The logs representing changes made to the data and the data dictionary after the particular snapshot time and the snapshot of the data corresponding to the particular snapshot time are available in the main database at the time the subsequent snapshot of the data dictionary is generated. The data can thereby be replicated from a logical time earlier than the time at which the request to replicate is received.

In another particular arrangement, a failover to the main database occurs, thereby resulting in the main database operating as a primary database and the alternate database as a logical standby database for the main database as of the particular snapshot time. The main database permits changes to the data to be made before the subsequent snapshot of the data dictionary is generated, thereby avoiding the need to make the main database unavailable for updates at the time of fail over for a period of time required to generate a snapshot of the data dictionary. In a replication configuration, a need exists to replicate at least a portion of a database by a secondary ("replicated") database. The replicated (secondary) database needs a consistent version of the data dictionary from the primary database at the point at which it (the secondary) was generated. Further, it may be desirable to replace or undo changes to the replication database. Such changes may be for historical, recovery, test, or other purposes, and employ the logs to analyze changes that occurred prior to the cause for replication (i.e. before the point at which the replication database was created or generated).

In a data storage environment, it is often desirable to undo, or rollback, a set of changes made to stored data. Such a rollback, or rewind, may be desirable for a variety of reasons, such as a data entry error, historical accounting, and alternate site failover operations. Other scenarios may be envisioned by those of skill in the art. Conventional recovery procedures, however, often rely on a snapshot, or fixed capture of a database at a known stable point. Such snapshots are typically expensive in terms of resources used to capture them (i.e. time and CPU allocation). Accordingly, conventional recovery selects a particular previously generated snapshot as a time to restore to. It may be infeasible to generate a snapshot at the optimal or desired restore time, or it may not be known if the database is in a consistent (stable) state. Accordingly, conventional database recovery may be limited to a previously established snapshot time.

Further, a database environment often employs an alternate storage mechanism in the way of a standby or replication database. The alternate storage mechanism complements a primary database to support operations such as failover, replication for offline tasks, and backup/recovery activities. Such a storage environment also employs a redo or undo log to track changes and facilitate reversion, or rollback, of the database. Typical conventional database replication solutions based on the journaling feature track changes depends on getting a data dictionary snapshot at a known point, and allow capturing changes from the point where the data dictionary snapshot has been taken. Data dictionary snapshots are, however, expensive to obtain since this requires locking of all relevant tables making up the data dictionary so that a consistent view of the data dictionary can be obtained. As a result, such data dictionary snapshots are taken infrequently. This also limits the points in time that a log-based replication can be initiated from a source database (the points in time correspond to the number of data dictionary snapshots available in the past). It would be beneficial to have the ability to restore the data dictionary snapshot to known points in the past even though no snapshot was actually captured at these points in time. This will allow the flexibility of initiating log-based replication at many more point in time, without having to pay the penalty of capturing data dictionary snapshots at all interesting initiating points. Further, a database environment often employs an alternate storage mechanism in the way of a standby or replication database. The alternate storage mechanism complements a primary database to support operations such as failover, replication for offline tasks, and backup/recovery activities. Such a storage environment also employs a redo or undo log to track changes and facilitate reversion, or rollback, of the database. Configurations herein are based, in part, on the observation that it would be beneficial to rollback, or rewind, a data dictionary to an arbitrary point preceding a later snapshot. Accordingly, configurations discussed further below provide a rollback mechanism that identifies a set of changes to a database, and "backs out," or rewinds, the database to a previous, arbitrary point (time) by generating a logical inverse of the change command and applying the logical change to the physical volume containing the data. In this manner, the generated logical change is not bound to the physical structure of the database from which the change log emanated (i.e. is applicable to "hot site" or redundant volumes). Further, the logical change record is applicable to an arbitrary time along the continuum defined by the change record, and is not bound to milestones of previously generated snapshots.

In a mathematical sense, such logical rollback includes the ability to capture source database changes for the purpose of rollback (or undo) at some time N, and rollback (rewind) the database to a time M, such that M is earlier than N. The logical rollback is applicable to a variety of operational scenario. In an exemplary configuration that follows, a rollback during a standby database failover is depicted. This exemplary configuration teaches a metadata rollback and change log rewind to a target restore point corresponding to a failover time, however other configurations for logical rollback will be apparent.

In a conventional redundant storage framework, the primary and standby storage systems each employ a data dictionary, typically referred to as metadata, that defines the structure and arrangement of the data stored therein. Generally, a data dictionary is a representation of a structure, and a snapshot is a particular structure captured at a point in time. The data dictionary is typically defined in a data definition language (DDL), and is employed to identify physical storage locations corresponding to the logical table references (e.g. table and field names). Since the physical storage arrangement may differ between the primary DB and the standby DB, each has a respective set of metadata. Since changes to the database may change the metadata (e.g. DDL definitions) as well as the data, it is important to ensure that changes are interpreted against the corresponding metadata. A so-called "snapshot" of the conventional data dictionary provides a consistent view of the metadata at a particular point in time, and provides a fixed reference for locations of data changes (updates). Accordingly, conventional approaches compute such a snapshot when performing a failover or recovery to ensure consistency between the primary and standby databases.

Unfortunately, the conventional approaches suffer from the shortcoming that computing a snapshot is both time and computationally intensive, particularly for a large data dictionary, typically locking the conventional database for a period of time. In a conventional primary/standby configuration, a redo log enumerates or queues changes made to the database to allow for reconstruction, or rollback, of the database to a particular point. The redo log, similar to a journal file, enumerates changes made to both the data dictionary, or metadata, and changes to the user data. In the redo log employed herein, the redo log includes change records in a redo stream. The redo stream may include volatile and non-volatile storage, including archive records employed for historical purposes. The change records are retrieved, or "mined," to identify and reverse or reapply previous changes, as needed. Accordingly, the redo stream is available for identification of previous changes as far back as is needed for the metadata rollback as defined herein. Some of the changes, therefore, may affect the data dictionary against which the user data changes are predicated. Accordingly, it is important to interpret the user data changes in light of the data dictionary changes reflecting the data dictionary at the point at which the data change was made. Conventional approaches suffer from the shortcoming that they are unable to recreate a timely snapshot of the metadata (data dictionary) to correspond to a particular point in the redo log.

Conventional mechanisms for restoring a database to a previous state suffer from shortcomings avoided by the invention defined by the present claims. One approach is to lock, or "freeze," data dictionary access while changes are reversed and undone. Such approach is undesirable because it impedes database access and generally either interrupts a substantial number of users and/or need be performed at low utilization hours i.e. overnight. Another approach is an "undo" command, which is common in many applications and which queries a redo buffer retaining a predetermined interval or volume of previous commands. This approach may be undeterministic because of space limitatios in the redo buffer and may not be available for all scenarios if the restore time exceeds the range of the redo buffer. In contrast, the approach presented herein mines (identifies and retrieves) the data dictionary changes backwards to identify a data dictionary state corresponding to a desired arbitrary time independently of available snapshots. The desired previous state maybe computed concurrently with ongoing database operations, as the database remains accessible and the redo log (stream) remains continually updated with ongoing change records.

Accordingly, configurations discussed herein provide for a rollback, or rewind, of the metadata to a point at which a failover or other metadata change occurred, therefore "rewinding" the metadata to a previous consistent point. The redo log identifies both metadata and data changes or updates. A recovery processor identifies transaction entries in the redo log resulting in changes to the metadata. The changes are identified backward to a target recovery time. Such transactions affecting the metadata are stored in a stack along with the set of changes effected by each transaction. The transactions are then backed out of the metadata according to the stack to restore the metadata to the state at the target recovery time. Data changes from the redo log may then be applied using the corresponding metadata as it existed at the target recovery time, i.e. the time the data changes occurred.

Therefore, configurations discussed herein allow a failover to occur out of band with a recovery or rollback operation, such as would be performed in the event of database failover, for example. In other words, a conventional failover to a logical standby database requires a recovery process to capture a snapshot of its data dictionary in the redo stream, so that other standby databases can correctly interpret the redo generated by the new primary DB. However, capturing the snapshot of the data dictionary is a time consuming task, and may delay the failover operation. A scheme that requires that the conventional data dictionary snapshot be taken inline with the failover operation cannot be done in constant time (it is by definition proportional to the size of the data dictionary). In contrast, configurations herein rewind, or recover, the metadata at a target recovery time prior to the most recent snapshot. Since the target recovery time is not bound by the timing of the snapshots, but rather may be at an arbitrary point chosen as the target recovery time, a failover or recovery operation need not rely on or wait for a snapshot to occur.

The operations discussed herein are applicable to a variety of database scenarios in which restoration of the data dictionary to a previous state may be beneficial. In an exemplary scenario, discussed below, a primary database and a standby database are employed in a failover context. Alternate configurations employ a master site and a replication site for generating a replication database for testing or offline tasks. Other uses will be apparent to those of skill in the art without departing from the spirit and scope of the claims.

In an exemplary scenario depicting a failover including primary (database A) and standby databases (database B), once a failover operation is executed (subsequent to a site failure at the primary database) the original standby database (B) assumes the role of the primary database. Thus when the original primary database (A) comes alive again, it will need to assume the role of a standby and start mining the redo logs generated by the new primary database (B). For this to happen, the new primary database (B) must take a snapshot of its data dictionary into its redo logs, so that the failed primary database (A) can be brought back successfully as a standby database. However, taking data dictionary snapshots can be expensive, since it requires locking of tables comprising the data dictionary, and may impact the usual user operations. However, with the method described here of rolling back the data dictionary to a pre-determined point in time, we can take the snapshot of the data dictionary in parallel with the user workload at the new primary (B), since the original primary database (A) can always roll back the data dictionary snapshot thus taken to the time when the failover occurred.

In an exemplary scenario depicting a replication database environment, the method employs logical replication, i.e. replication data on another heterogeneous site (ie with different storage mapping than the site being replicated. Currently, log-based replication of data has three pre-requisites (where "replication start time" is defined as the time when log-based replication is started): the table snapshot taken at the "replication start time;" the data dictionary snapshot at the "replication start time;" and all archived logs starting from the "replication start time." Since data dictionary snapshots are to be taken explicitly by the DBA, the DBA should never start replicating a table from the past. Replication starting at some past time is useful for trend analysis, doing temporal analysis on table data. With this configuration, table replication can be started at any time in the past, as long as a backup of the database at the past time, and all archived logs since the backup to the time that a data dictionary snapshot is taken are available. Therefore, the replication configuration allows any data dictionary snapshot to be reverted, or rolled back to an earlier point in time by applying undos to the specific tables from the archived logs of change records.

In further detail, the method of restoring a database according to configurations herein includes identifying, in a redo log, a time corresponding to a desired target restore time, and identifying a metadata snapshot corresponding to a time following the target restore time. The preexisting metadata snapshot is taken at a time after the target recovery time, and will be rewound to the target recovery time. A recovery processor determines, from the redo log, metadata changes made from the target restore time to the time of the metadata snapshot, and reverts the metadata to the target restore time by backing out changes made to the metadata between the target restore time and the time of the metadata snapshot. Building the metadata snapshot further includes locking a set of DB tables at a particular time for which the snapshot is sought, and unloading the metadata snapshot from the tables, such that the tables are indicative of the metadata state at the particular time. Accordingly, reverting includes undoing, via a journaling mechanism, transactions occurring from the target restore time to the time of the metadata snapshot, such that the target time precedes the time of the metadata snapshot In the exemplary configuration, determining the metadata changes includes identifying an ordered set of changes made from the time of the metadata snapshot back to the target restore time via the redo log, and storing the entries in a redo stack according to the order of occurrence. The recovery processor therefore identifies transactions in the redo log corresponding to changes made since the point of interest (i.e. target recovery time). The recovery processor or a recovery process identifies, from the redo log, logged DB commands resulting in changes affecting the primary metadata representation on the standby server, in which each of the changes corresponds to a transaction, and pushes transactions corresponding to the identified changes onto the redo stack. The recovery processor associates each of the changes with the corresponding transaction on the stack, and formulates a DB command operable to back out each of the transactions on the stack, in which backing out is performed by formulating an inverse of the logged DB command for each change in each backed out transaction.

Formulating an inverse DB command includes generating an inverse SQL statement by identifying, from the redo log, a new value applied by the command to be backed out, and identifying, from the redo log, an old value replaced by the new value. The recovery processor then generates a SQL statement to replace the new value with the old value. Generating the SQL statement further includes retrieving a physical reference to the new value, and mapping the physical reference to a logical reference indicative of a DB entity to which the SQL statement applies. The recovery processor retrieves the old value from the redo log, and concatenates the mapped logical reference with the retrieved old value to build a SQL statement applying the old value to the database entity.

In the exemplary arrangement, mapping the physical reference to a logical reference includes retrieving a physical location specifier from the physical reference, in which the physical location specifier is indicative of a block on a volume such as a disk sector or segment. In the exemplary configuration, the logical references are defined according to a relational DBMS arrangement, however alternate normalization schemes may be employed. The recovery processor maps the physical location specifier to a name index of database object names, in which the database object names correspond to database tables and fields (i.e. SQL labels, or identifiers). The recovery processor then formulates a syntactical representation of the physical location specifier including the mapped object names, such that the syntactical representation is operable to perform similarly as the physical location specifier on a different physical volume. Therefore, the redo log includes physical operations to the database, such that the physical operations are indicative of storage locations on a storage medium independent of database table labeling. In the exemplary configuration, the physical operations are block based referring to physical storage, and are employed for converting the physical database operations into logical operations by computing a physical reference from the logical table reference and a metadata mapping. Further, the logical operations are indicative of fields in database tables (i.e. SQL labels), such that the field and table references are applicable to a plurality of physical database instantiations, independently of the physical medium upon which the database is stored.

Accordingly, in the exemplary relational DBMS arrangement, the logical operations are table based referring to logical table storage, and are employed to compute a logical table reference from a physical reference and an inverse metadata mapping.

Ordering of the changes occurs by measuring time increments according to a system change number (SCN), in which the system change number is indicative of an ordered sequence of occurrences. The recovery processor orders database changes by the corresponding SCN, and applies each of the data based transaction from the redo log such that the metadata reflects the metadata based transactions applicable to the time of the corresponding data base transaction (i.e. the metadata as it existed when the logged user data transaction occurred).

Since the standby database need not mirror the physical arrangement or structure of the primary DB, the standby DB may be employed for executing applications on the standby DB in read-only manner. Such applications may create additional indices to the standby database, the standby database accessible in a non-intrusive manner independently of the primary database, therefore allowing concurrent usage of the data without disrupting the failover characteristic of the standby DB.

In a particular arrangement, configurations discussed herein provide for a rollback, or rewind, of the relational DBMS metadata from a snapshot time to a target recovery point at which a failover or other metadata change occurred, therefore "rewinding" the metadata to a previous consistent point. The redo log identifies both metadata and data changes or updates. A recovery processor identifies transaction entries in the redo log resulting in changes to the metadata. The changes are identified backward to a target recovery time. Such transactions affecting the metadata are stored in a stack along with the set of changes effected by each transaction. The transactions are then backed out of the metadata according to the stack to restore the metadata to the state at the target recovery time. Data changes from the redo log may then be applied to the corresponding data (i.e. user data, as distinguished from metadata) as it existed at the target recovery time, i.e. the time the data changes occurred.

Therefore, configurations discussed herein allow the failover to occur out of band with a recovery or rollback operation, such as would be performed in the event of database failover, for example. In other words, a failover to a logical standby database requires a recovery process to capture a snapshot of its data dictionary in the redo stream, so that other standby databases can correctly interpret the redo generated by the new primary DB. However, capturing the snapshot of the data dictionary is a time consuming task, and may delay the failover operation. A scheme that requires that data dictionary snapshot be taken inline with the failover operation cannot be done in constant time (it is by definition proportional to the size of the data dictionary). In contrast, configurations herein rewind, or recover, the metadata at a target recovery time prior to the most recent (or other) snapshot. Since the target recovery time is not bound by the timing of the conventional snapshots, but rather may be at an arbitrary point chosen as the target recovery time, a failover or recovery operation need not rely on or wait for a snapshot to occur.

Conventional standby database sites reflect a logical duplication, not necessarily a physical one, from the primary sites (primary DB) they support. Accordingly, the standby sites employ a difference physical layout than the primary site. The primary site issues a stream of parallel redundant updates to the standby site so that the standby site may remain current with the primary site. Unfortunately, such an approach has several shortcomings. Some of the redundant updates may pertain to metadata at the primary site. Such metadata changes pertain to administrative or structural aspects of the data. Further, as indicated above, the standby database, while maintaining a similarly logical structure, typically has a different physical layout than the primary. While the logical (e.g. table level) references between the two sites will be similar, the corresponding physical references may differ. Accordingly, the standby site computes a new physical reference from each logical reference received from the primary site. The physical reference is recomputable by an inverse operation using the metadata mapping of the logical table and field references to the physical locations on the disk.

In the event of a redo (recovery) operation, the standby site attempts to recover the physical references to correspond to logical changes (references) at the primary. However, the metadata at the standby site refers to physical reference at the standby site. The standby metadata is not operative to recompute physical references at the primary site. Accordingly, the standby site maintains a copy of the primary metadata for computing, or reverse mapping, the physical references to logical references. This, in turn, allows physical reference computation and reconstruction (unwinding) of the primary site data from inverse SQL commands from the logical references. In other words, the unwinding of the primary data occurs by reversing the SQL commands applied during the period sought to be rewound. The reverse, or inverse, SQL is obtained by identifying the table attributes (objects) and values changed, identifying the previous values, and restoring the previous value to the identified attribute. Since, however, the physical locations of similar tables and attributes differs between the primary and standby sites, the primary metadata is employed to determine the physical location corresponding to a previous logical SQL command, i.e. the primary DB physical location corresponding to record A, table B of a SQL command, which may (and probably is) different than the physical location of record A, table B in the standby DB. Reconstruction of the primary metadata 124 corresponding to the point at which database updates relying on that metadata were made can be problematic.

For example, a failover operation from the primary database to the standby database requires the redo log to coordinate and synchronize changes to the database from the time of the failover. Configurations discussed herein allow a database server to capture the snapshot of the data dictionary out of band with the failover operation. During the failover, all relevant tables maintaining the data dictionary are locked, and the SCN say x (a measure of time) is noted before the locks are released. The SCN "x" provides us with the time at which the failover happened.

The failover is then allowed to proceed, and the logical standby database becomes a primary database and allows read/write access to other applications. These applications can modify the data dictionary (e.g. primary metadata) by performing DDL operations.

A new process is spawned, which captures the snapshot of the data dictionary at SCN "y" (>x). Note however that the recovery process should know the definition of the data dictionary as it existed at SCN "x", in order to interpret the redo records generated in the interval (x,y). This is accomplished by looking at all transactions that modified the data dictionary in the interval (x,y) and rolling back the effects of these from the data dictionary snapshot. Since the data dictionary tables are locked at SCN "x", recovery processing examines a finite interval (x,y) to find such transactions. "Interesting" transactions could not have modified the data dictionary prior to "x"

In conventional approaches prior to the capability of rewinding a data dictionary snapshot to an earlier consistent point, time to failover to a logical standby was proportional to the size of the data dictionary. In contrast, configurations herein provide constant time failover regardless of the data dictionary size.

FIG. 1 is a context diagram of an exemplary standby database environment suitable for use with configurations discussed herein. Referring to FIG. 1, the environment 100 includes a primary database 120 and a standby database 140. As indicated above, the standby database (standby DB) mirrors data stored in the primary database (primary DB) through a journaling mechanism 110 operable to ensure consistency between the primary DB 120 and the standby DB 140. Both the primary DB 120 and the standby DB 140 are mass storage arrays including one or more physical devices such as disk drives. As indicated above, they need not be co-located and are often remote when employed for disaster recovery failover support, and they need not be represented by similar hardware configurations, as will be discussed further below. The primary DB 120 connects to a network 112 for supporting a user community 114-1 . . . 114-3 with mass storage and retrieval services.

The primary database includes primary data 122 and primary metadata 124. The primary metadata 124 defines the type, structure and arrangement of the primary data 122, usually in a data definition language (DDL). Note that the metadata is also defined by tuples in DB tables, similar to user data, i.e. the structure of the data is itself stored in other tables, similar to the user data). The primary data 122 is the data values arranged in a normalized form defined by the primary metadata 124, typically in relational tables and fields, as shown by dotted line 125. Similarly, the standby metadata 134 defines the type, structure and arrangement of the standby data 132, shown by arrow 135. The standby data 132 reflects the primary data 122 in near real-time through a journaling mechanism for queuing and ensuring that updates made to the primary DB 120 also occurs in the standby DB 140. In the exemplary configuration, depicting standby failover, the journaling mechanism takes the form of a redo log 150. The redo log 150, traditionally employed as a journaling mechanism, is employed to recreate the primary database following a recovery. In the exemplary standby failover scenario presented herein, the redo log is employed in a "reverse" manner to undo changes by working backwards from a snapshot, rather then forwards. The redo log 150 stores changes made to the standby DB 140 to enable the standby DB 140 to recover all changes to the primary DB in the event of failure of the primary DB 120, as in a so-called "failover" scenario. Note that the redo log differs from conventional shadow set or other redundancy mechanisms such as RAID because the changes from the primary DB 120 are queued to the standby DB 140, rather than concurrently performed by a hardware shadow set. The redo log, therefore, remains operable in a conventional capacity as the primary communicator of DB changes in the event of loss or failure. Accordingly, the standby DB 140 need not be an exact duplicate of the hardware configuration of the primary DB 120, as will be discussed further below.

In the exemplary standby failover configuration shown, the journaling mechanism employs the redo log 150, which stores an ordered set of transactions and changes made to the database. A database snapshot, or primary metadata copy 136 stores a particular state of the metadata 124 that defines the tables and fields in the database. In the event of a failover, the snapshot copy 136 provides a consistent reference point from which to apply database changes. More specifically, database changes reference particular tables and fields. As indicated above, the metadata 124, 134 defines the table and field structure. Therefore, when a database command requesting a change is issued, typically in the form of a SQL statement, the metadata 124, 134 identifies the physical storage location of named tables and fields (logical reference) of the SQL statement, as shown by dotted lines 125 and 135.

Since the physical structure may differ, the primary DB 120 and the standby DB 140 each have respective metadata 124 and 134, corresponding to the respective data 122, 132, as shown by dotted lines 125, 135. In the event of a failure, the redo log 150 indicates the changes to the primary database 120. Often, metadata changes need to be backed out to apply database changes to the metadata as it existed at the time corresponding to the change. Such a metadata rollback, therefore, involves reconstructing the standby metadata 124 to a particular previous state applicable to the changes to be applied. In other words, database changes which effect the metadata may change the structure of the tables and fields such that physical positions and offsets of the tables and fields changes. Therefore, a change to, say, field "C" at column 3 is followed by a change to insert a column A1 at column 2, for example. Now, field C is at column 4 (a physical reference), since the metadata has changed. Earlier redo log 150 references to field C at column 3 are now invalid. Therefore, rewound or recovered data changes need to be interpreted or applied in view of the metadata (i.e. C at column 3) as it existed at the time the data change was made.

The redo log 150 stores physical references to the database changes. In the event of a database rollback, the unwind mapper 160, reverses an operation typically performed by the SQL parser 158 to forward map SQL tables and fields to physical disk block references, reverse maps the physical references to the corresponding logical references, typically SQL table and field names. Since forward (normal) database operations map the SQL labels (table and field names) to physical references, or locations via the corresponding metadata, the unwind mapper 160 is operable to map the physical references back to the SQL table and field names. However, since the physical structure of the standby DB 140 and primary DB 120 differ, a primary metadata copy 136 is stored at the standby database 140. Therefore, the standby DB 140 maintains both a primary metadata copy 136 reflecting the primary metadata 124, shown by arrow 164, and the standby data 132 reflecting the primary data 122, shown by arrow 162. Further, the standby DB 140 also maintains the standby metadata 134 reflecting its own standby data 132.

For illustration, consider the following SQL fragment example.

INSERT INTO SCOTT.EMP (EMPID, SALARY) VALUES (123, 81000).

In the SQL parser 158 or equivalent component, a mapping happens that maps EMPID and SALARY to some physical block locations, which may be referred as forward mapping SQL tables and fields. Configurations herein employ a component embodied in the unwind mapper 160 that performs an opposite function. This component is operable to performs this opposite function regardless of whether mining/applying is going forward, or mining/applying is going backward (unwinding). Therefore, INSERT INTO ([OBJ# 2005, COLUMN 1], [OBJ# 2005, COLUMN 2]) VALUES (123, 81000) may map to INSERT INTO SCOTT.EMP (EMPID, SALARY) VALUES (123, 81000); when applying going forward. Similarly it is mapped to DELETE FROM SCOTT.EMP WHERE EMPID =123 when unwinding. Therefore, even though the operation and operands are different when unwinding is happening, the distinction of identifier mapping remains as opposed to SQL parsing in the forward direction. In the exemplary configurations herein, the unwind mapper 160 performs mapping from physical kinds of addresses (in this example object and column numbers) to logical names (SQL tables and columns).

Therefore, in the event of a database rollback, the unwind mapper 160 recovers the physical references 166 for the primary database 120, maps the physical references 166 via the primary metadata copy 136, shown by arrow 168, to recover the logical references (i.e. table and field names) which can then be applied (arrow 169) to the standby metadata 134 to compute the proper physical references in the standby data 132, shown by arrow 135.

Figure 2:
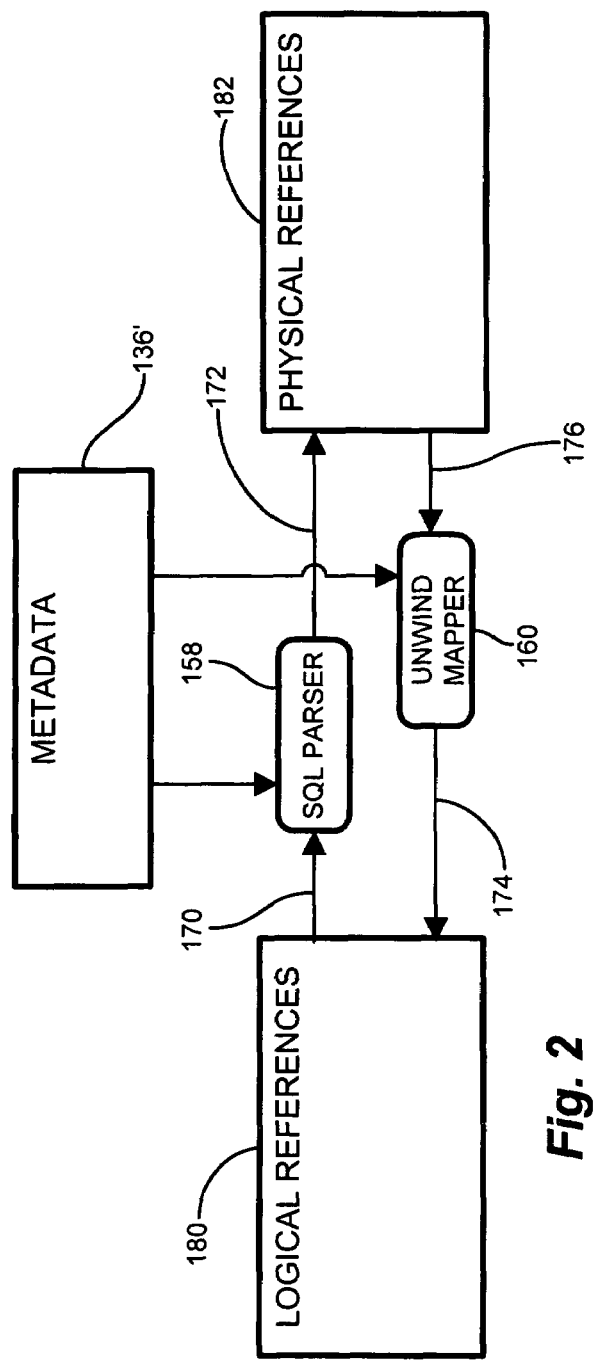
FIG. 2 is a block diagram of logical to physical database reference mapping in the environment in FIG. 1.

FIG. 2 is a block diagram of logical to physical database reference mapping in the environment in FIG. 1. Referring to FIGS. 1 and 2, a rollback operation backs out changes made to the metadata 164 so that data changes 162 occur relative to the metadata 136' they correspond to. Generally, the metadata 136' defines the physical location, or physical references 182 to data tables and fields based on a logical reference 180, such as a SQL table or field name. In the forward direction (i.e. normal, non-recovery activities), commands take the form of SQL statements having logical references 180 (i.e. mnemonic table and field names) received by an SQL parser 158, shown by arrow 170. The SQL parser 158 receives the applicable metadata 136', and maps, or translates, the logical references 180 to a physical reference 182, as shown by arrow 172. Conversely, in a rollback or recovery operation, the original SQL (logical reference) is recovered from the physical references 182 stored in the redo log 150. Since the logical references include SQL mnemonic labels, the logical references 180 are applicable to other physical databases sharing the same schema, i.e. to either the primary or standby databases 120, 140. The unwind mapper 160 receives the physical references 182 (i.e. storage locations), shown by arrow 176, and performs the inverse mapping back to the SQL mnemonic, shown by arrow 174. The resulting mapping yields the logical references 180, or SQL mnemonic identifier, which produced the transaction to be backed out.

Therefore, the SQL parser 158 is typically used to map logical references to physical references. The unwind mapper 160, in contrast, includes services to map physical to logical, as will be apparent in the description below. While either logical->physical or physical->logical mapping may be employed both for forward updates and unwinding (backing out changes previously made), the unwind mapper 160 performs the physical to logical computations in the configurations of the invention as discussed below. As indicated above, when backing out changes in the standby database 140, the original SQL is recovered using the primary metadata copy and the physical references in the redo log. The recovered LCRs are employed to generate "inverse" SQL for backing out the transaction from the standby database, which has different physical references than the primary database. Recovery of the logical references 180 (i.e. SQL syntax) for backing out and recreating transactions will be apparent in the description below.

Figure 3:
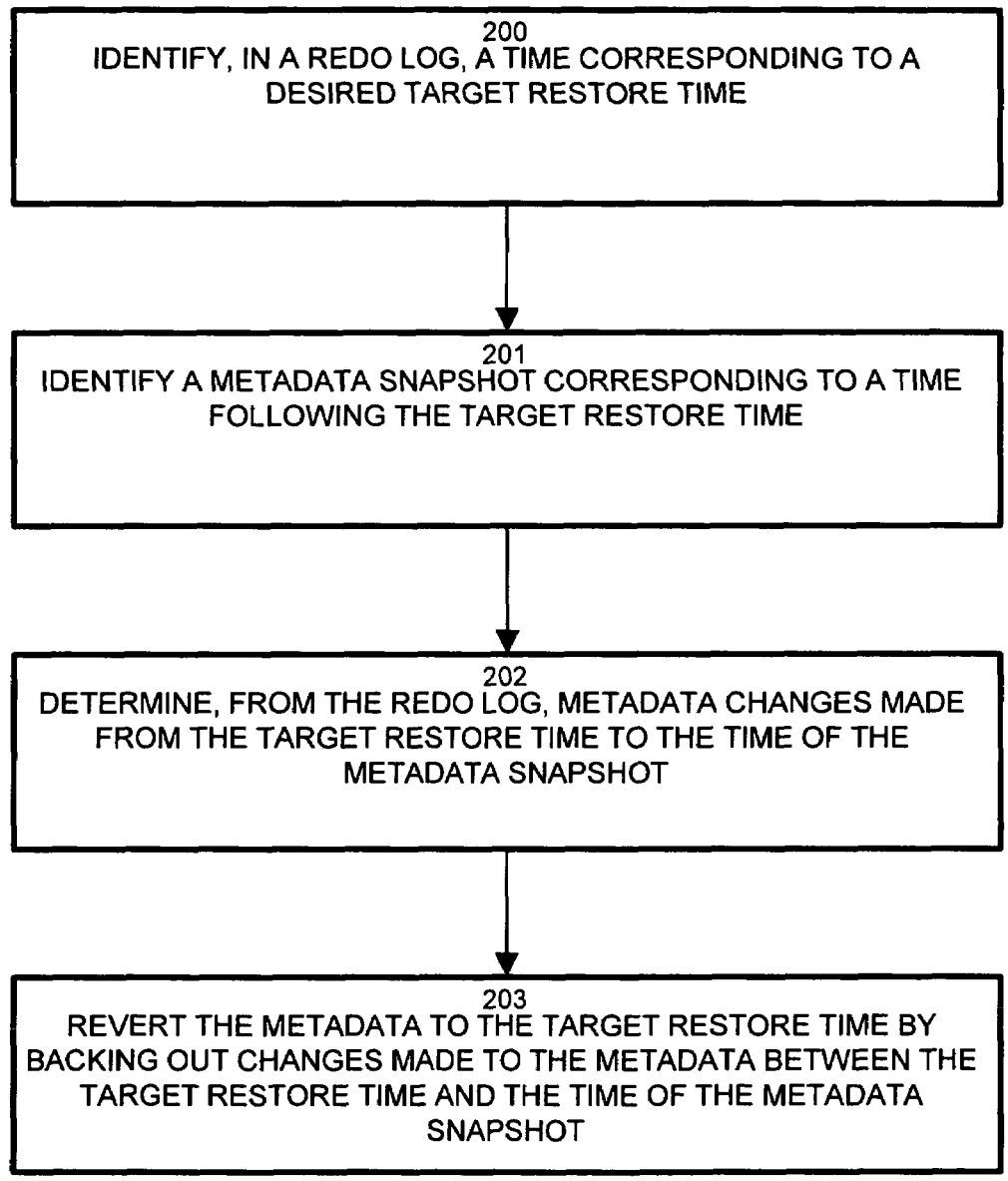
FIG. 3 is a flowchart of an exemplary database restore (recovery) operation in the environment of FIG. 1.

FIG. 3 is a flowchart of an exemplary database restore (recovery) operation in the environment of FIG. 1. Referring to FIGS. 1-3, the method of restoring a database as disclosed herein includes identifying, in the redo log 150, a time corresponding to a desired target restore time 190 (FIG. 4, below), as depicted at step 200. The redo log 150, also known as a redo stream, is a journaling mechanism that identifies changes made to the primary database 120. At step 201, a recovery operation identifies a metadata snapshot (e.g. primary metadata copy 136) corresponding to a time following the target restore time 192. As indicated above, snapshots are time consuming to gather. Accordingly, while it is beneficial to have a snapshot of the metadata at the exact point of the desired recovery, it may be cumbersome to generate such a snapshot 136. Therefore, configurations herein allow a rollback of the primary metadata copy 136 to a time previous to the available snapshot to allow a recovery operation to proceed at the target restore time 190 preceding the snapshot time 192 (FIG. 4, below).

At step 202, the recovery operation determines, from the redo log 150, metadata changes 164 made from the target restore time to the time of the metadata snapshot 136. The metadata changes 164 identify possible database structure changes, and thus identify changes that may render earlier physical references 182 invalid. Often, the metadata changes 164 are interspersed with data changes 162 in the redo log 150. Accordingly, changes to the primary metadata 124 are distinguished from the changes to the primary data 122 in the redo log 150. At step 203, the recovery operation reverts the primary metadata copy 136 to the target restore time 190 by backing out changes made to the primary metadata 124, and hence to the primary metadata copy 136, between the target restore time and the time of the metadata snapshot 192. Backing out, therefore, involves recovering the original SQL applied to the primary database 120, and reapplying the reverse SQL to the standby metadata 134 such that the redo log changes applied against the standby metadata 134 yield the proper physical references 182 in the redo log 150.

Figure 4:
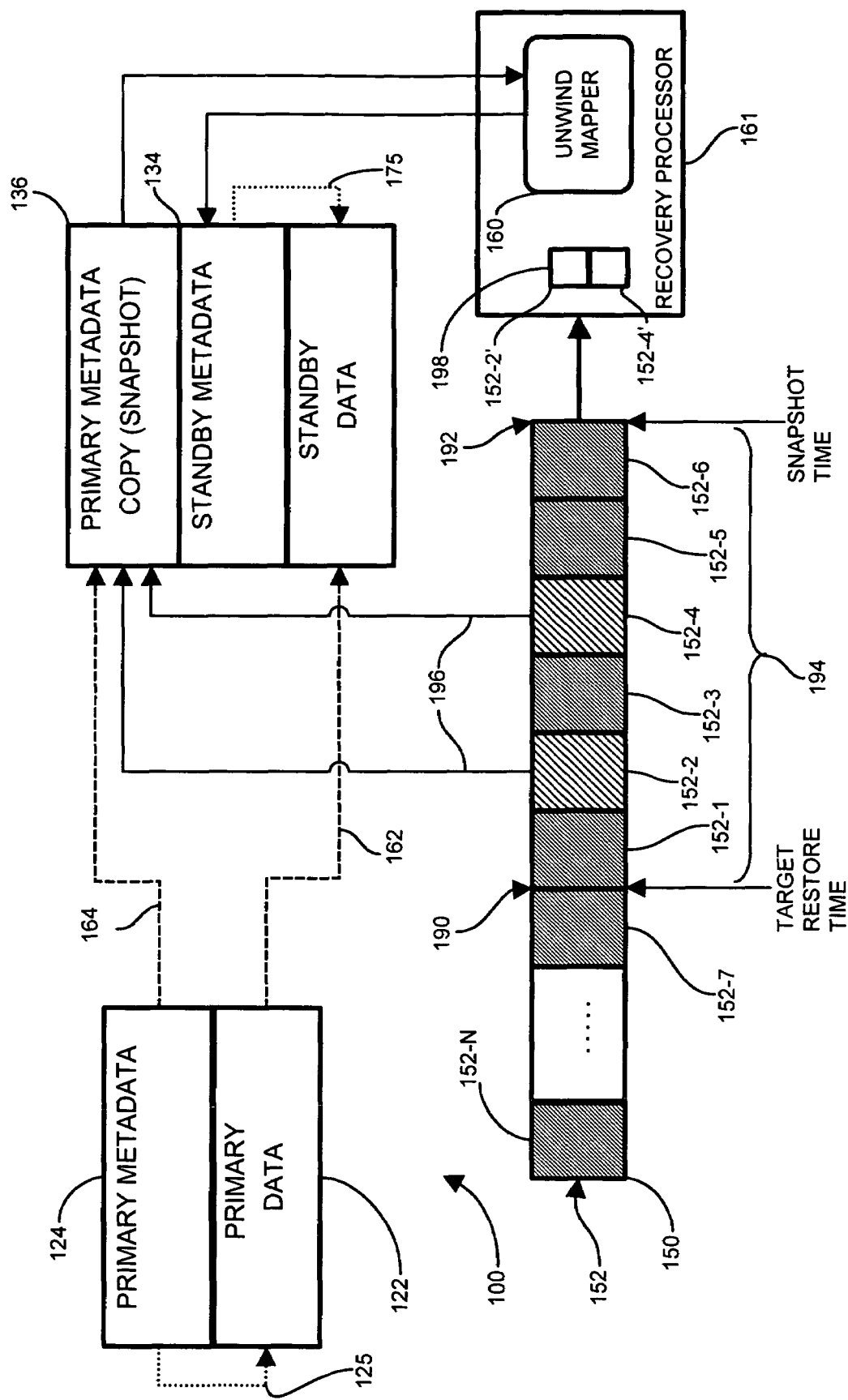
FIG. 4 is a block diagram of a database restore employing the method depicted in FIG. 3.
Figure 5:
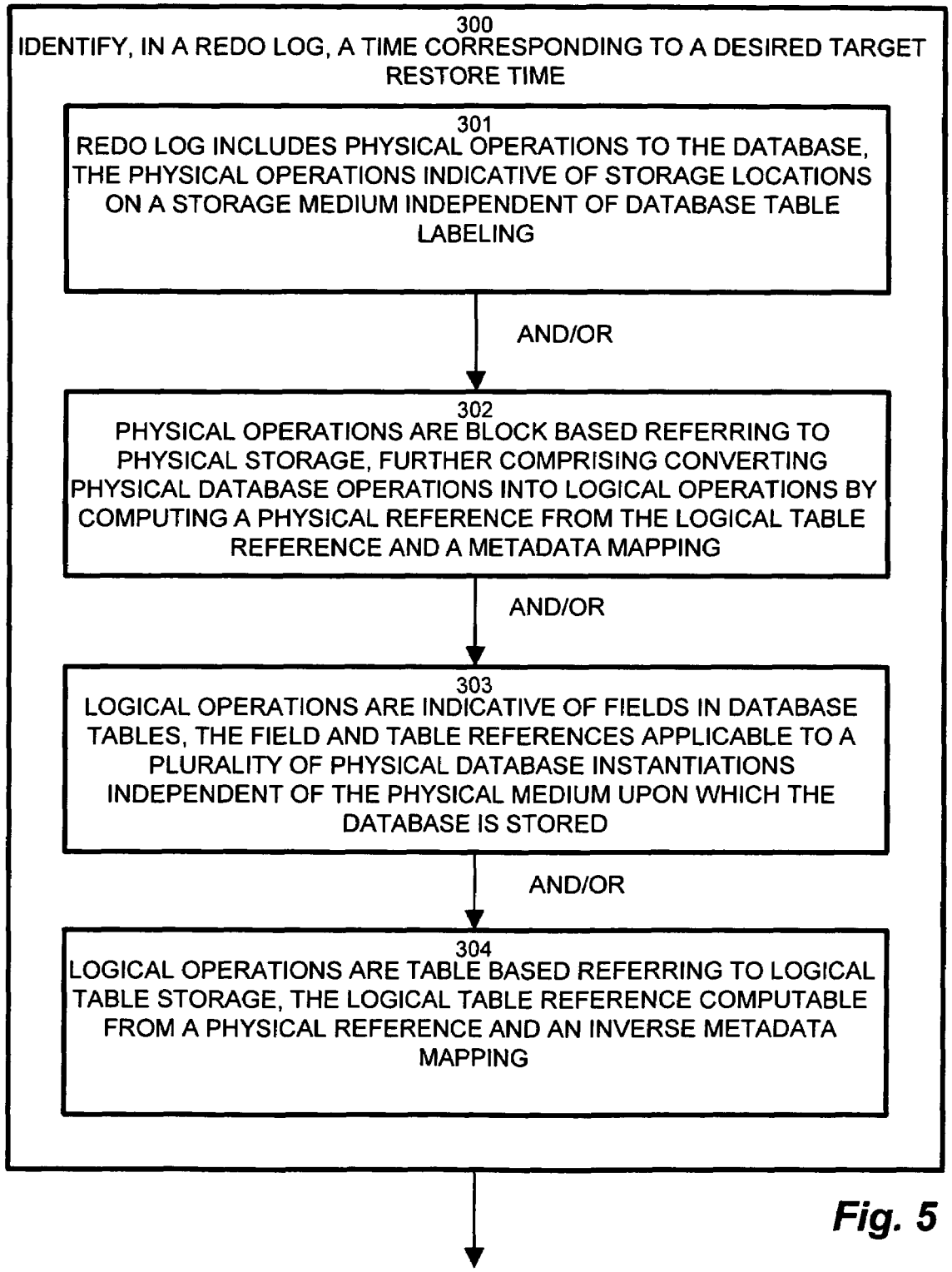
Figure 6:
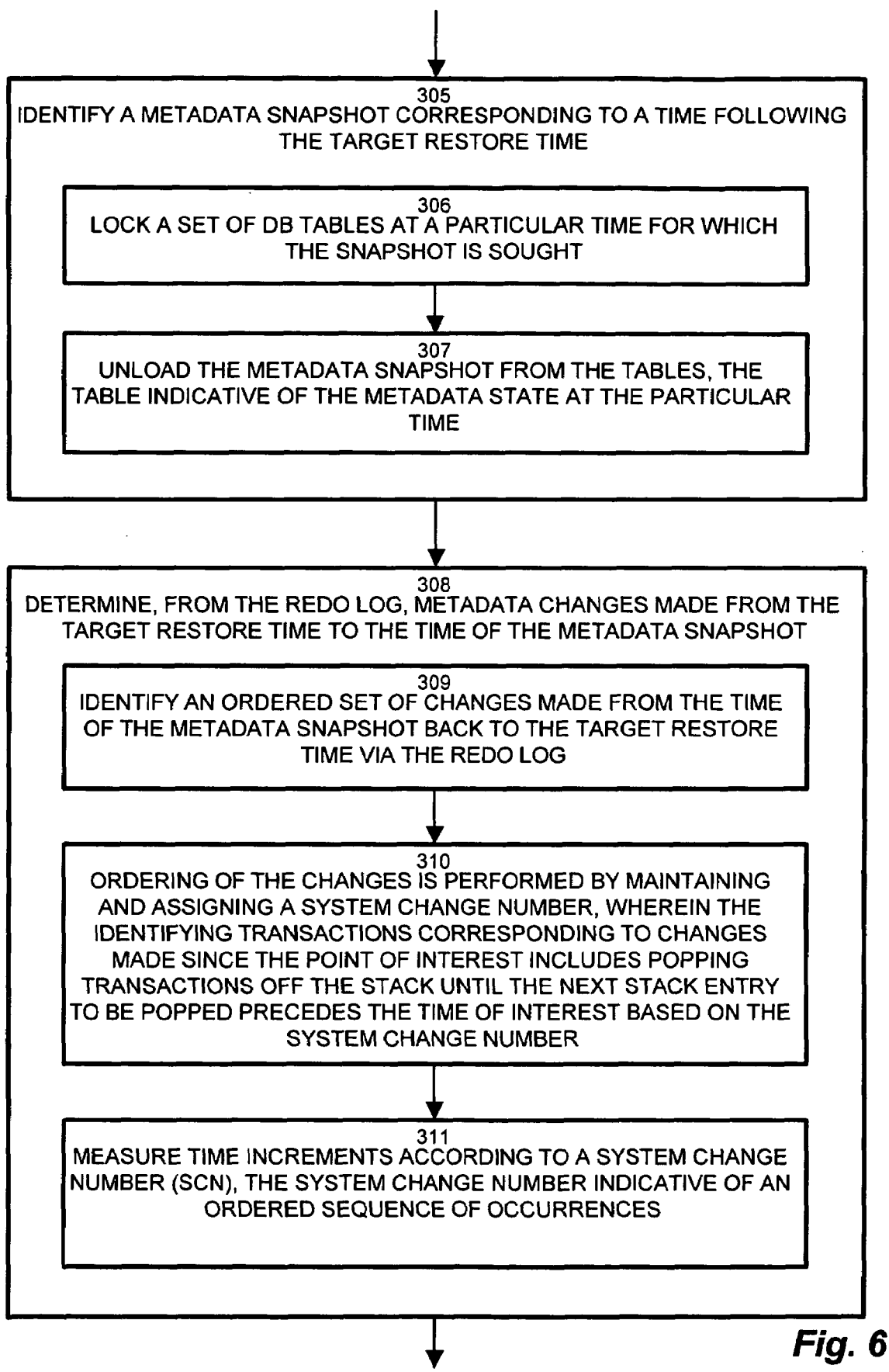
Figure 7:
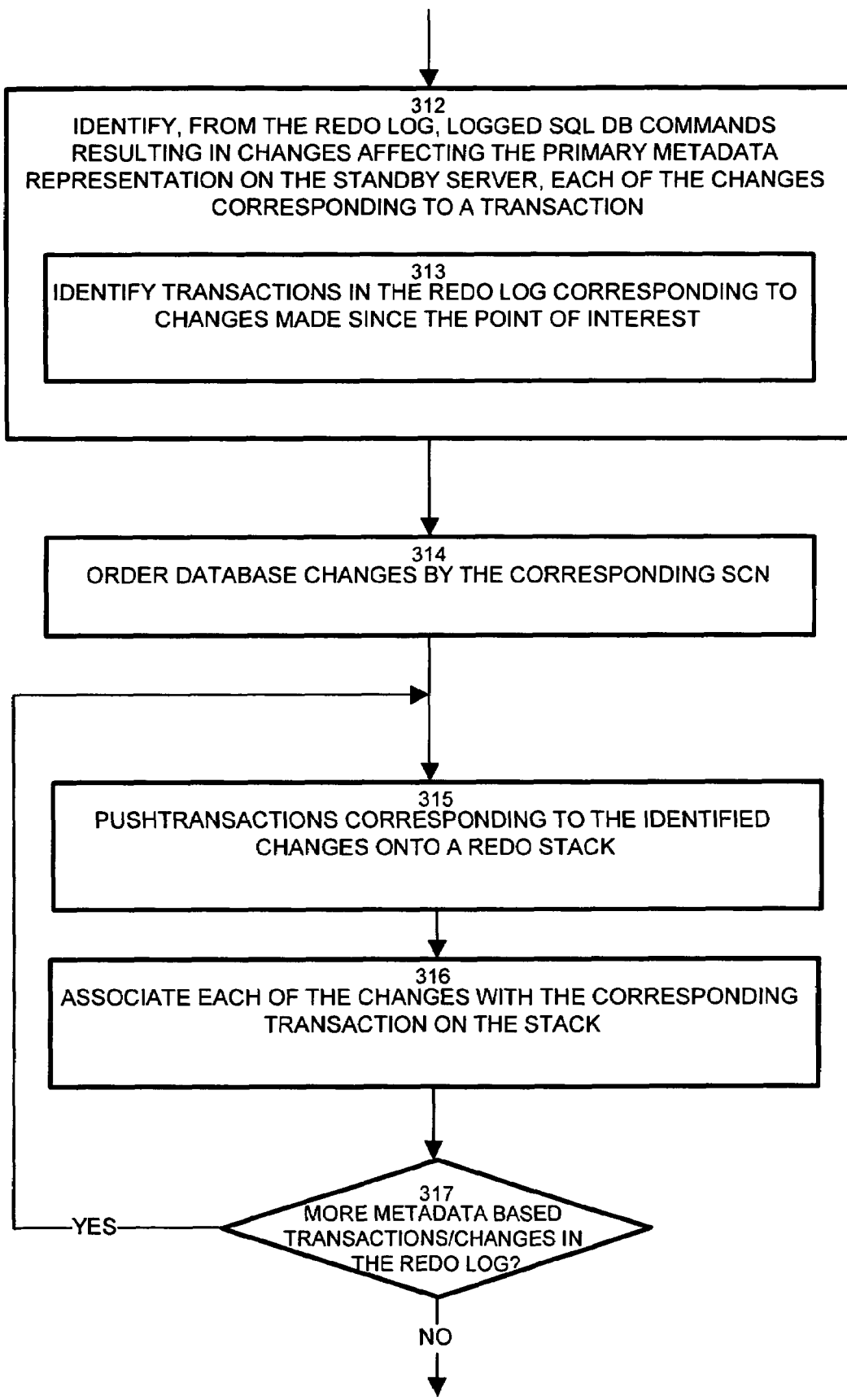
Figure 9:
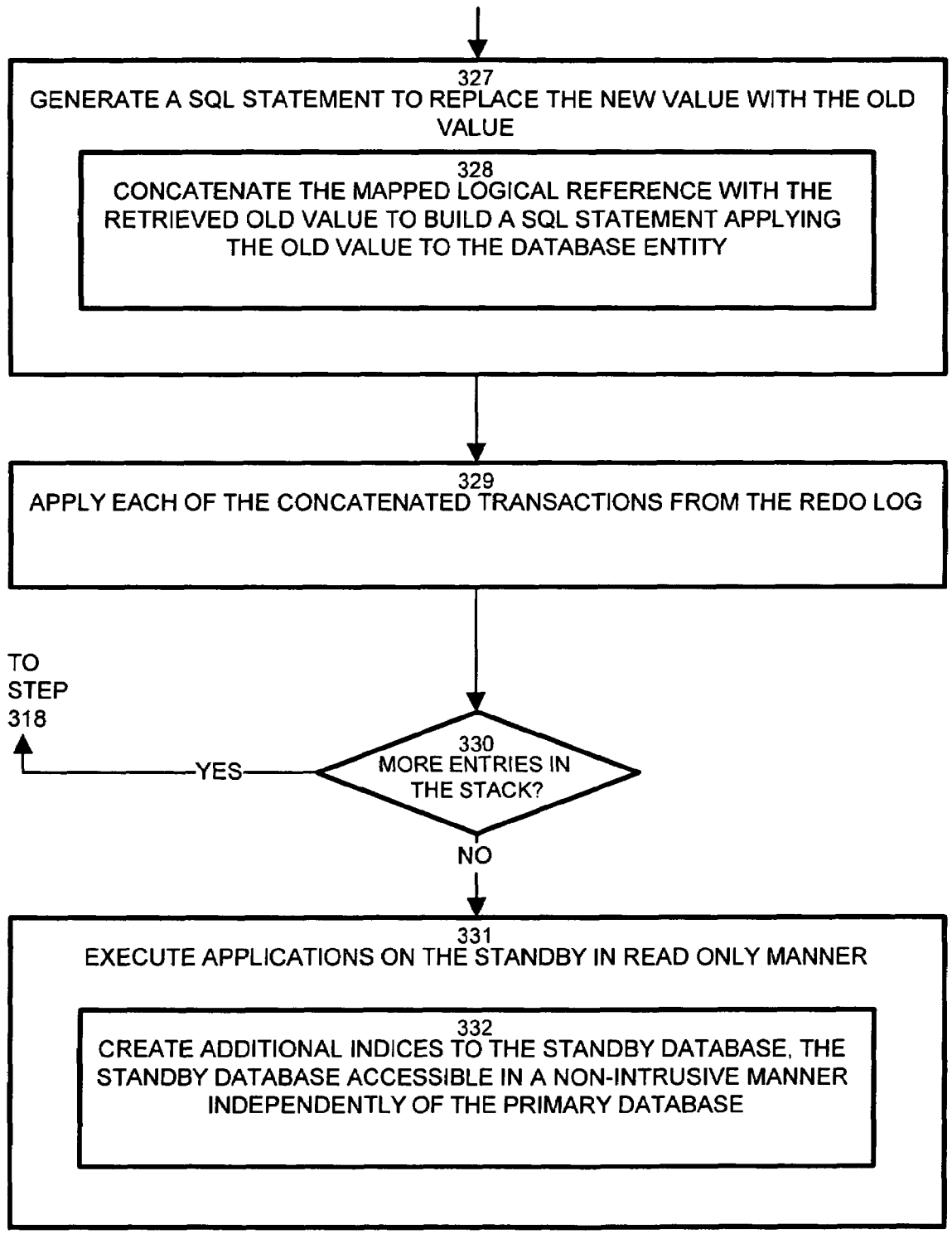

FIG. 4 is a block diagram of a database restore employing the method depicted in FIG. 3. Referring to FIGS. 2-4, a rollback operation attempts to restore the metadata to a target restore time 190, based on a snapshot 136 taken at a later snapshot time 192. Therefore, the rollback operation now to be described results in the primary metadata copy 136 reverting to the target restore time 190 by backing out metadata changes made during the intervening window 194. A recovery processor 161 including the unwind mapper 160 accesses the redo log 150. The redo log 150 includes a series of ordered changes 152-1 ... 152-N (152 generally), each corresponding to a transaction, not specifically shown (a transaction includes one or more changes). The recovery processor 161 identifies changes 152 that affect the primary metadata (124,136). In the exemplary configuration shown, changes 152-2 and 152-4 are directed to the primary metadata copy 136, as shown by arrows 196. The redo log 150 stores an ordered record of the changes 152 affecting either the primary data 122 or the primary metadata 124, and is ordered according to a system change number (SCN) or other temporal ordering mechanism, discussed further below. Typically, the recovery processor 161 will order transactions including one or more changes 152, however alternate data structures may be employed without departing from the principles discussed herein. The metadata changes 196 may often be sparse compared to the data changes, although the ratio does not affect the method herein. The recovery processor 161 orders the identified metadata changes 152-2, 152-4, such as in a redo stack 198 or other arrangement. For each identified change, an inverse command is computed and employed to back up (undo) the metadata change until the changes occurring in the intervening window 194 are rolled back, thus reverting the metadata to the target restore time 190, as will now be discussed in further detail with respect to the flowchart in FIGS. 5-9.

FIGS. 5-9 are a flowchart of an exemplary metadata rollback for a database restore operation according to FIG. 4. Referring to FIGS. 4-9, the exemplary method of restoring a database via metadata rollback includes, at step 300, identifying, in the redo log 150, a time corresponding to a desired target restore time 190. The redo log 150 includes an ordered set of physical operations to the database, in which the physical operations are indicative of the physical references 182 (i.e. storage locations) on a storage medium independent of database table labeling (i.e. SQL mnemonics, in the exemplary relational DBMS), as depicted at step 301. The physical operations are block based, referring to physical storage (i.e. physical references 182), and includes converting physical database operations into logical operations by computing the logical reference 180 from the physical reference 182 and a metadata mapping, as depicted at step 302. In other words, the physical storage device (i.e. a disk drive) allocates disk blocks which are mapped and indexed according to the tables and fields (i.e. logical references) which they represent. Therefore, the logical operations are indicative of fields in database tables, and are expressed in mnemonic SQL labels. Accordingly, the mnemonic field and table references are applicable to a plurality of physical database instantiations independent of the physical medium upon which the database is stored, as depicted at step 303. The logical references 180 in the logical operations are therefore table based referring to logical table storage, in which the logical table reference 180 is operable to be computed from a physical reference 182 and an inverse metadata mapping by the unwind mapper 160, as shown at step 304, discussed further below.

Upon receiving a request or indication of a failover or rollback, the recovery processor 161 identifies a metadata snapshot 136 corresponding to a time following the target restore time 190, as depicted at step 305. Typically this will be the first successive snapshot after the target restore time 190. Snapshots may be gathered routinely, as part of backup, or adhoc, in response to a recovery need. As indicated above, conventional mechanisms restored to a point of a most recent or other snapshot, and substantial computational resources and downtime were required to identify or create snapshots directed to a particular target restore time. In the exemplary configuration, the rollback, in effect, works "backward" from the snapshot 136 to recreate the metadata (primary metadata copy 136) corresponding to the target restore time 190.

Building the metadata snapshot 136 includes locking a set of DB tables at a particular time for which the snapshot is sought, as depicted at step 306. Typically, the snapshot 136 has been previously generated, thus avoiding the conventional practice of locking the DB in an adhoc manner for recovery. A locking operation prevents access during the snapshot generation, so that tables are not updated inconsistently. Immediately following locking and releasing to ensure a consistent DB state, the metadata snapshot is unloaded from the tables, in which the tables indicative of the metadata state at the particular time, as shown at step 307.

The recovery processor 161 determines, from the redo log 150, metadata changes 164 made from the target restore time 190 to the time of the metadata snapshot 192, as depicted by step 308. The metadata changes 164 are those affecting only metadata 136, shown by changes 152-2 and 152-4 and occurring during the recovery interval 194. Employing the redo log 150, the recovery processor 161 identifies an ordered set of changes 152 made from the time of the metadata snapshot 192 back to the target restore time 190 via the redo log 150, as shown at step 309. The ordering of the changes, in the exemplary configuration, is performed by maintaining and assigning a system change number (SCN), which is a generated relative counter assigned to each of the changes. Alternatively, other ordering schemes, such as a system clock timestamp, may be equally effective. As will be discussed further below, the ordering allows identification of transactions corresponding to changes 152 made since the point of interest (i.e. target restore time 190), such that a stack or other data structure is employed for popping transactions off a redo stack 198 until the next stack entry to be popped precedes the time of interest (or an empty stack occurs) based on the system change number, as shown at step 310. Accordingly, the recovery interval measures time increments according to the system change number (SCN), such that the system change number is indicative of an ordered sequence of occurrences, as depicted at step 311. Various optimization techniques may be employed to minimize processing performed in a range of interest around the target restore time. In the exemplary configuration, the SCN identifies transactions in the range of interest potentially affecting the primary metadata copy 126, and others may be aggressively filtered in the interest of efficiency.

The redo log 150 includes database commands (typically SQL commands, or statements) which affect both the user data and which affect the metadata (i.e. storage and structure). The rollback operation is directed to commands affecting the metadata such that commands affecting user data are properly interpreted. Accordingly, the recovery processor 161 identifies, from the redo log 150, logged DB commands resulting in changes 152 affecting the primary metadata representation (copy) 136 on the standby DB 140, shown by arrows 196, in which each of the changes 152 corresponds to a transaction, as depicted at step 312. The recovery processor 161 identifies transactions (i.e. changes) 152 in the redo log 150 corresponding to changes 152 made since the point of interest, as shown at step 313. The recovery processor 161 orders database changes by the corresponding SCN (step 314), and pushes transactions corresponding to the identified changes 152-2, 152-4 onto the redo stack 198. The recovery processor 161 stores the entries 152-2', 152-4' in the redo stack 198 according to the order of occurrence, defined by the SCN, as depicted at step 315. Further, the recovery processor 161 associates each of the changes 152 with the corresponding transaction on the redo stack 198, as shown at step 316, as a transaction includes one or more changes 152, as shown at step 316. Typically, changes corresponding to a transaction are ordered according to completion of the last change 152 in the set of changes 152-N that define the transaction.

A check is performed at step 317 to determine if there are more changes 152 to be pushed onto the redo stack 198. If there are more changes 152, then control passes to step 315 to push all changes 152 (transactions) between the snapshot time 192 and the target restore time 190 onto the redo stack 198. If all changes 152-N' are on the redo stack 198, then the recovery processor 161 begins popping the entries 152-N' off the stack 198 to revert the primary metadata copy 136 to the target restore time 190 by backing out changes 152 made to the metadata 124 between the target restore time 190 and the time of the metadata snapshot 192. Accordingly, in the exemplary configuration, the recovery processor 161 begins undoing, via a journaling mechanism, transactions occurring from the target restore time 190 to the time of the metadata snapshot 192, in which the target time 190 precedes the time 192 of the metadata snapshot 136. Therefore, at step 318, the recovery processor 161 begins formulating a DB command operable to back out each of the transactions on the stack 198 (transactions may include multiple SQL commands), in which backing out is performed by formulating an inverse of the logged DB command for each change in each backed out transaction. At step 319, the recovery processor 161 formulates an inverse DB command further comprises generating an inverse SQL statement by identifying, from the redo log, a new value applied by the command to be backed out. From the redo log 150, the recovery processor 161 identifies the old value replaced by the new value, as shown at step 320. The recovery processor then retrieves a physical reference to the new value from the redo log 150, as depicted at step 321. The old value and the physical reference 182 to the new value may be employed to reverse map an SQL statement to restore the old value in the proper table and field. Accordingly, the recovery processor 161 maps the physical reference 182 to the logical reference 180 indicative of the DB entity to which the SQL statement applies, as depicted at step 322. Mapping the physical reference 182 to the logical reference 180 further includes, at step 323, retrieving a physical location specifier from the physical reference, such that the physical location specifier is indicative of a block on a volume (i.e. disk sector or segment). Using the redo log 150, the recovery processor 161 maps the physical location specifier to a name index of database object names, in which the database object names corresponding to database tables and fields, as depicted at step 324. The database object names are derived from the primary metadata copy 136 joined with the standby metadata 134. The database object and names are the SQL identifiers employed in the SQL commands as logical references. The recovery processor 161 formulates a syntactical representation of the physical location specifier including the mapped object names such that the syntactical representation is operable to perform similarly as the physical location specifier on a different physical volume, as depicted at step 325. Thus, the SQL logical references mapped from the physical references 182 in the redo log 150 are applicable to the standby database as SQL statement (i.e. logical references). The recovery processor 161 retrieves the old value from the log 150, as depicted at step 326, and generating a SQL statement to replace the new value with the old value, as disclosed at step 327. As shown at step 328, the recovery processor generates the statement by concatenating the mapped logical reference 180 with the retrieved old value to build a SQL statement applying the old value to the database entity (i.e. logical references 180 mapped from the redo log).

The recovery processor 161 applies each of the concatenated transactions from the redo log 150 to the metadata 124, 136 reflecting the metadata-based transactions, as depicted at step 329, to complete the rollback. Therefore, the recovery processor 161 may apply each of the data-based changes (152-1, 152-3, 152-5, 152-6, 152-7) to the standby data 132 using the primary metadata copy 136 as it existed at the time the data based changes were made to the primary database 120. To restate, the primary metadata copy 136 is employed to construct the correct logical commands to apply. Therefore, the mapping of the reconstructed DB commands occurs as follows: 1) find physical references in redo log 150; 2) map physical references 152 to logical in terms of primary metadata 124; 3) mutate references from primary logical names to standby logical names reflected in the standby metadata 134. A check is performed, at step 330, to determine if there are more changes from the redo log 150 to back out of the primary metadata copy 136, by checking if there are more entries 152-N' in the stack 198, as depicted at step 330. If there are more stack entries 152-N', then control reverts to step 318 to process the metadata changes 152.

During the ongoing operation of the primary and standby database, since the standby DB 140 is logically linked to the primary DB 120, and need not maintain physical consistency, the standby database is accessible in a read-only manner to other applications. Accordingly, at step 331, the recovery processor 161 (or the server on which the recovery processor or process operates) executes applications on the standby in read only manner. Execution may include creating additional indices to the standby database, such that the standby 140 database is accessible in a non-intrusive manner independently of the primary database 120, as depicted at step 332. Such execution serves to offload application processing to the standby database, since the standby database 140 is a near real-time duplicate of the primary database. Read only access is beneficial for reporting and accounting functions which tend to gather, but do not update or modify, the data.

As indicated above, the exemplary configuration of logical database rollback has been discussed in terms of standby database failover. Alternate configurations may be apparent to those of skill in the art. For example, alternate configurations include a DB client built on top of the recovery processor 161 for operations such as historical queries, adhoc queries, and other applications operable for rewinding the database to an arbitrary point based on logical interpretation and processing of the redo log. Those skilled in the art should readily appreciate that the programs and methods for rolling back changes to a database from a redo log as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for method of rolling back changes to a database from a redo log as defined herein has been particularly shown and described with references to embodiments thereof, it will be understood by those skilled in the art that various changes in form and details may be made therein without departing from the scope of the invention encompassed by the appended claims.

What is claimed is:

1. A method comprising:
   detecting a failover event for a primary database, where the primary database includes an associated data dictionary;
   performing a failover by transferring database responsibilities from the primary database to a secondary database and includes causing a delay for capturing a snapshot of the data dictionary until a subsequent time to the failover;
   storing, in a redo log, database operations performed on the secondary database from a time of the failover;
   subsequent to the failover, capturing the snapshot of the data dictionary; and
   generating a recreated data dictionary representing a state of the data dictionary at the time of the failover, where the generating includes performing redo operations from the redo log from a time of the capture of the snapshot back to the time of the failover.

2. The method of claim 1 where capturing the snapshot of the data dictionary includes capturing data that defines a structure of the primary database and an arrangement of data stored in the primary database.

3. The method of claim 1 where transferring the database responsibilities includes making the secondary database function as the primary database, and making the primary database function as a backup database to the secondary database.

4. The method of claim 1 further comprising obtaining the time of the failover and locking the data dictionary; and noting a time before the lock on the data dictionary is released.

5. A computer system, comprising:
   a primary database and a data dictionary that stores data that defines a structure of the primary database and an arrangement of content stored in the primary database;
   a stand-by database configured as a backup to the primary database;
   at least one processor configured to execute instructions stored in a memory that when executed cause the computer system to:
      in response to a failover event associated with the primary database, perform failover operations including making the stand-by database function as a new primary database;
      during the failover operations, delay capturing a snapshot of the data dictionary;
      store, in a redo log, database operations performed with the stand-by database from a time of the failover;
      subsequent to the failover, capture a current snapshot of the data dictionary; and
      recreate the data dictionary in a state at the time of the failover by performing redo operations from the redo log from a time of the current snapshot back to the time of the failover.

6. The computer system of claim 5 further comprising:
   one or more replication databases configured to provide a redundant architecture to the primary database.

7. The computer system of claim 5 where the computer system is configured to transmit copies of the recreated data dictionary to one or more replication databases.

8. The computer system of claim 5, wherein the memory further comprises stored instructions that when executed cause the computer system to obtain the time of the failover and lock the data dictionary; and to note a time before the lock on the data dictionary is released.

9. A non-transitory computer-readable storage medium storing instructions that when executed by a processor cause the computer system to perform a method, the method comprising:
   detecting a failover event for a primary database, where the primary database includes an associated data dictionary;
   performing a failover by reassigning a secondary database to function as a new primary database where performing the failover includes delaying the capture of the snapshot of the data dictionary until a subsequent time;
   storing, in a redo log, database operations performed on the secondary database from a time of the failover;
   subsequent to the failover, capturing the snapshot of the data dictionary; and
   recreating the data dictionary in a state at the time of the failover by performing redo operations from the redo log from the capture of the snapshot back to the time of the failover.

10. The computer-readable storage medium of claim 9 where the reassigning includes making the secondary database function as the primary database, and making the primary database function as a backup database to the secondary database.

11. The non-transitory computer-readable storage medium of claim 9, further comprising instructions for obtaining the time of the failover and locking the data dictionary, and instructions for noting a time before the lock on the data dictionary is released.

* * * * *